(12) United States Patent
Inoue

(10) Patent No.: US 11,718,187 B2
(45) Date of Patent: Aug. 8, 2023

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/883,134

(22) Filed: Aug. 8, 2022

(65) Prior Publication Data

US 2022/0381326 A1 Dec. 1, 2022

Related U.S. Application Data

(62) Division of application No. 17/423,519, filed as application No. PCT/JP2020/008504 on Feb. 28, 2020.

(30) Foreign Application Priority Data

Mar. 29, 2019 (JP) ................................. 2019-066935

(51) Int. Cl.
*F16H 57/02* (2012.01)
*B60L 15/20* (2006.01)
(Continued)

(52) U.S. Cl.
CPC ............ *B60L 15/2054* (2013.01); *B60K 1/00* (2013.01); *B60L 50/51* (2019.02); *B60L 53/22* (2019.02);
(Continued)

(58) Field of Classification Search
CPC ...... B60L 15/2054; B60L 50/51; B60L 53/22; B60L 2220/50; B60L 2240/423; B60K 1/00; B60K 2001/001; F16H 1/06; F16H 3/728; F16H 37/0813; F16H 48/08; F16H 57/037; F16H 2057/02034; F16H 2057/02052; F16H 2057/02043;
(Continued)

(56) References Cited

U.S. PATENT DOCUMENTS 9,533,570 B2  1/2017  Matsuda et al.
2015/0274013 A1  10/2015  Matsuda et al.

FOREIGN PATENT DOCUMENTS

DE  112014001112 T5 * 12/2015 ............. B60K 17/04
JP  2013174338 A * 9/2013
(Continued)

*Primary Examiner* — Justin Holmes
(74) *Attorney, Agent, or Firm* — Oliff PLC

(57) ABSTRACT

A rotary electric machine is disposed coaxially with an input member more toward a first side in an axial direction than a first gear that meshes with a second gear. A third gear rotates integrally with second and fourth gears that mesh with third gear more toward second side in axial direction than first and second gears. An axis of a counter gear mechanism is below axis of rotary electric machine and axis of differential gear mechanism. An inverter device more toward first side in axial direction than fourth gear and above axis of differential gear mechanism while that inverter device overlaps fourth gear as seen in axial direction. A specific portion of inverter device is between rotary electric machine and fourth gear in axial direction, such that specific portion overlaps counter gear mechanism as seen in up-down direction and overlaps rotary electric machine as seen in axial direction.

4 Claims, 4 Drawing Sheets

(51) Int. Cl.
  *B60L 50/51*    (2019.01)
  *B60K 1/00*     (2006.01)
  *F16H 1/06*     (2006.01)
  *F16H 3/72*     (2006.01)
  *F16H 48/08*    (2006.01)
  *B60L 53/22*    (2019.01)
  *F16H 37/08*    (2006.01)
  *F16H 57/037*   (2012.01)

(52) U.S. Cl.
  CPC ............... *F16H 1/06* (2013.01); *F16H 3/728* (2013.01); *F16H 37/0813* (2013.01); *F16H 48/08* (2013.01); *F16H 57/037* (2013.01); *B60K 2001/001* (2013.01); *B60L 2220/50* (2013.01); *B60L 2240/423* (2013.01); *B60Y 2400/61* (2013.01); *F16H 2057/02034* (2013.01); *F16H 2057/02052* (2013.01)

(58) Field of Classification Search
  CPC ....... F16H 2057/02086; B60Y 2400/61; Y02T 10/64; Y02T 10/70; Y02T 10/72
  See application file for complete search history.

(56) References Cited

FOREIGN PATENT DOCUMENTS

| | | | |
|---|---|---|---|
| JP | 2015067221 A | * | 4/2015 |
| JP | 2015-182505 A | | 10/2015 |
| JP | 2015182505 A | * | 10/2015 |
| WO | 2014/057514 A1 | | 4/2014 |

* cited by examiner

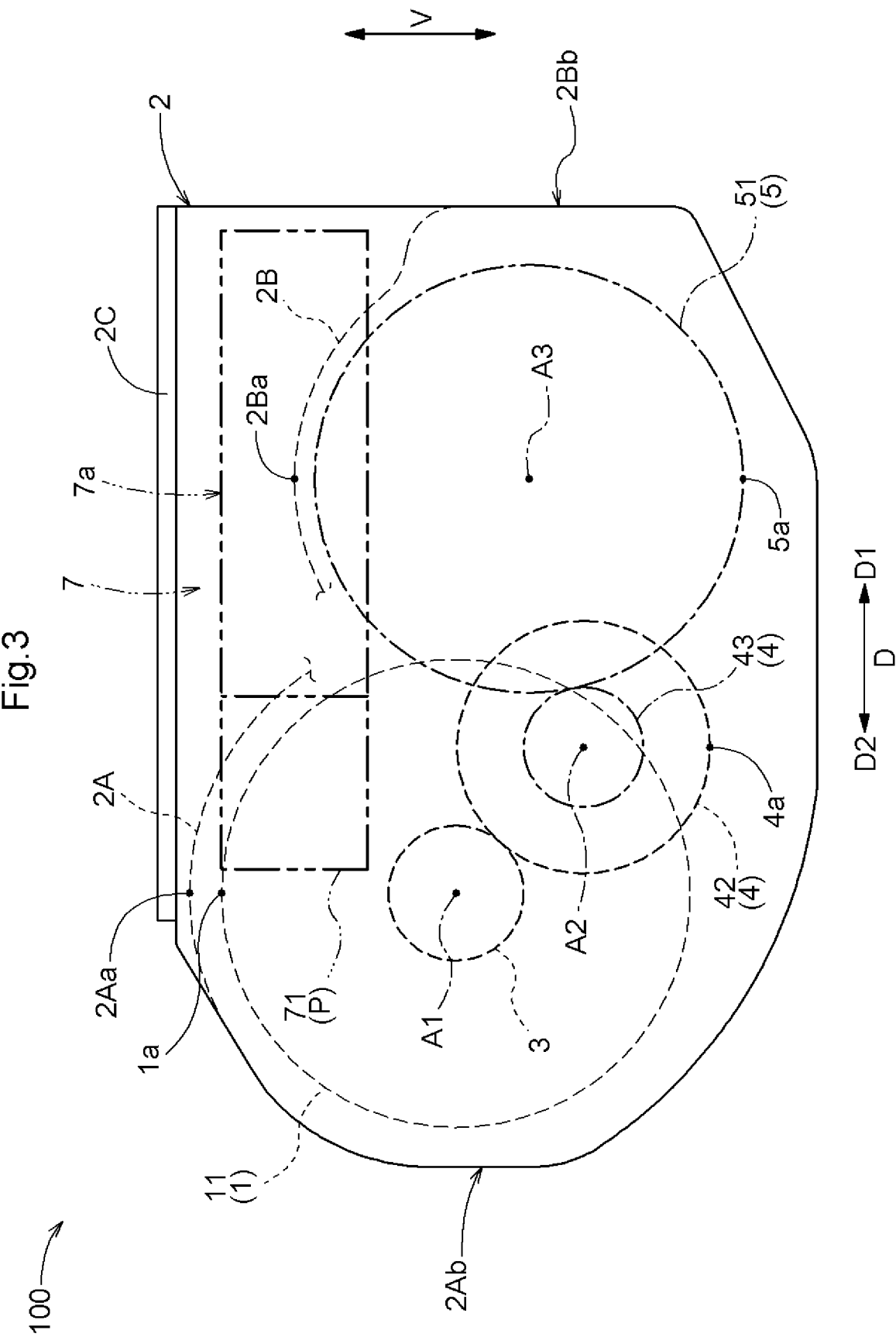

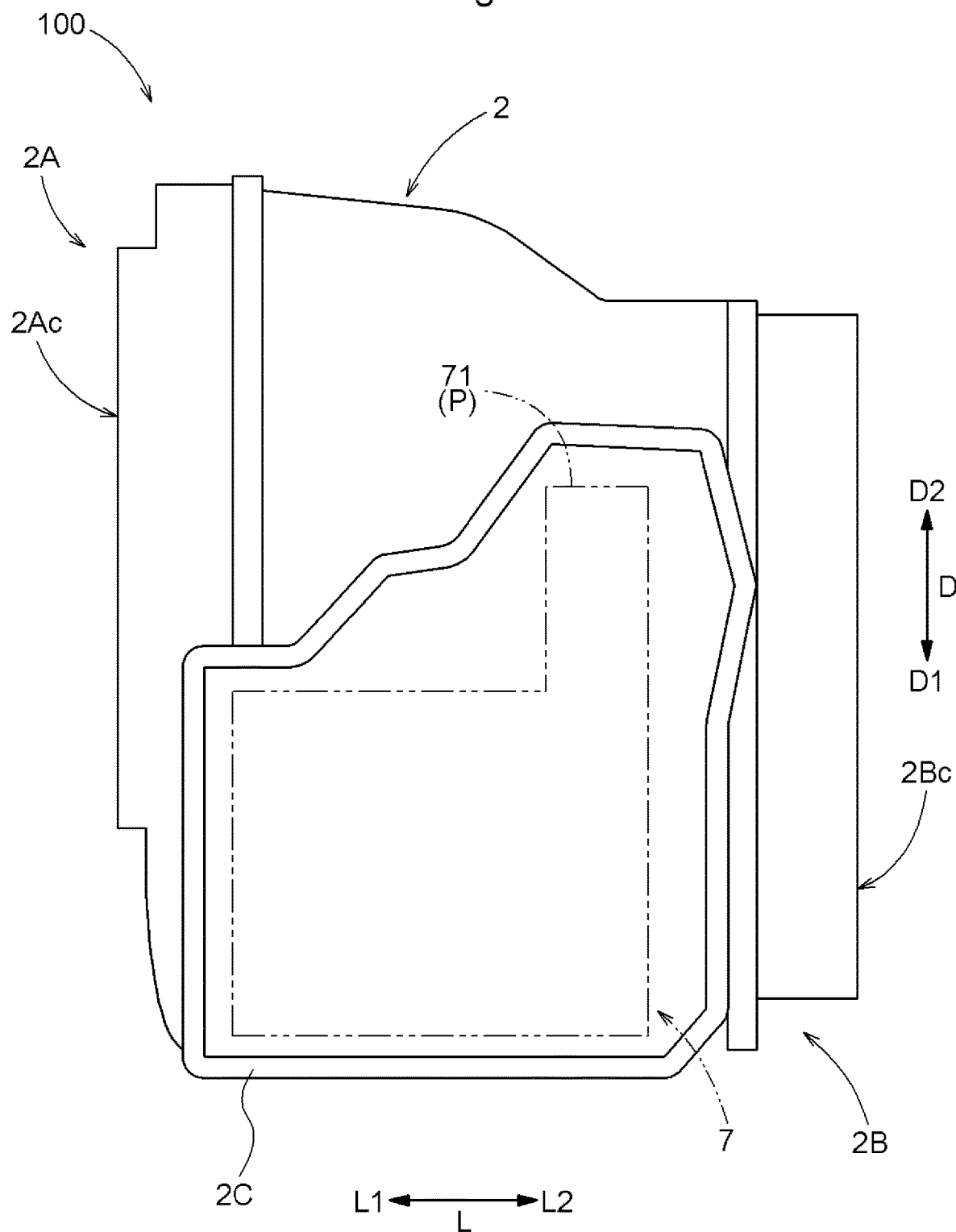

VEHICLE DRIVE DEVICE

This is a Divisional Application of application Ser. No. 17/423,519 filed Jul. 16, 2021, which is a National Phase of International Application No. PCT/JP2020/008504 filed Feb. 28, 2020, which claims the benefit of Japanese Application No. 2019-066935 filed Mar. 29, 2019. The disclosures of the prior applications are hereby incorporated by reference herein in their entireties.

TECHNICAL FIELD

The present disclosure relates to a vehicle drive device. The vehicle drive device includes: a rotary electric machine that serves as a driving force source for wheels; a counter gear mechanism; a differential gear mechanism; and an inverter device that controls the rotary electric machine.

BACKGROUND ART

An example of such a vehicle drive device is disclosed in Patent Document 1 below. Hereinafter, in the description of the background art, reference numerals in Patent Document 1 are used in parentheses.

A vehicle drive device (1) of Patent Document 1 includes: a rotary electric machine (MG) serving as a driving force source for a pair of wheels (W); an input member (SR2) having a first gear (GMo) and drivingly connected to the rotary electric machine (MG); a pair of output members (AX) that is drivingly connected to the pair of wheels (W); a counter gear mechanism (CG) having a second gear (GCi) that meshes with the first gear (GMo) and a third gear (GCo) that rotates integrally with the second gear (GCi); a differential gear mechanism (DF) having a fourth gear (GDi) that meshes with the third gear (GCo) and distributing rotation of the fourth gear (GDi) to the pair of output members (AX); and an inverter device (IN) that controls the rotary electric machine (MG).

RELATED ART DOCUMENTS

Patent Documents

Patent Document 1: Japanese Unexamined Patent Application Publication No. 2015-182505 (JP 2015-182505 A) (FIG. 2 and FIG. 4).

SUMMARY OF THE DISCLOSURE

Problem to be Solved by the Disclosure

In the vehicle drive device (1) of Patent Document 1, the inverter device (IN) is disposed above the differential gear mechanism (DF). The fourth gear (GDi) of the differential gear mechanism (DF) has a larger dimension in the radial direction than the first gear (GMo) of the input member (SR2) and the second gear (GCi) and the third gear (GCo) of the counter gear mechanism (CG). In such a vehicle drive device (1), the fourth gear (GDi) having a relatively large diameter and the inverter device (IN) are arranged side by side in the radial direction (vertical direction), so there has been an issue that the dimension in the radial direction tends to increase. If the dimension of the vehicle drive device (1) in the radial direction is large, it becomes difficult to dispose the vehicle drive device (1) in a space having a small radial margin, such as a space under the floor of the vehicle.

Therefore, it is desired to suppress the increase in size of the vehicle drive device in the radial direction due to the placement of the inverter device.

Means for Solving the Problem

In view of the above, a vehicle drive device has a characteristic configuration of including:
- a rotary electric machine that serves as a driving force source for a wheel;
- an input member having a first gear and drivingly connected to the rotary electric machine;
- a pair of output members each drivingly connected to the wheel;
- a counter gear mechanism having a second gear that meshes with the first gear and a third gear that rotates integrally with the second gear;
- a differential gear mechanism having a fourth gear that meshes with the third gear and distributing rotation of the fourth gear to the pair of output members; and
- an inverter device that controls the rotary electric machine, wherein:
- the rotary electric machine is disposed coaxially with the input member and is disposed more toward a first side in an axial direction than the first gear, the first side being one side of the rotary electric machine in the axial direction;
- the third gear and the fourth gear are disposed more toward a second side in the axial direction than the first gear and the second gear, the second side being another side in the axial direction;
- an axis of the counter gear mechanism is disposed below both an axis of the rotary electric machine and an axis of the differential gear mechanism;
- the inverter device is disposed more toward the first side in the axial direction than the fourth gear and above the axis of the differential gear mechanism while being disposed at such a position that the inverter device overlaps the fourth gear as seen in an axial direction along the axial direction; and
- a specific portion of the inverter device is disposed between the rotary electric machine and the fourth gear in the axial direction, at such a position that the specific portion overlaps the counter gear mechanism as seen in an up-down direction along an up-down direction and overlaps the rotary electric machine as seen in the axial direction.

Generally, the fourth gear of the differential gear mechanism has a larger dimension in the radial direction than the first gear of the input member and the second gear and the third gear of the counter gear mechanism. According to this characteristic configuration, the inverter device is disposed at such a position that the inverter device overlaps the fourth gear as seen in the axial direction along the axial direction. Thus, it is possible to suppress the increase in dimension of the vehicle drive device in the radial direction due to the placement of the inverter device.

Further, according to this characteristic configuration, the third gear and the fourth gear are disposed more toward the second side in the axial direction than the rotary electric machine, the first gear, and the second gear. That is, the third gear and the fourth gear are disposed closer to the second side in the axial direction in the vehicle drive device. This facilitates securing a space for placing the inverter device more toward the first side in the axial direction than the fourth gear having a relatively large diameter, outside the rotary electric machine, the first gear, and the second gear in the radial direction.

This characteristic configuration also facilitates securing a space for placing the inverter device above the axis of the differential gear mechanism, compared with the case where the axis of the counter gear mechanism is disposed above at least one of the axis of the rotary electric machine and the axis of the differential gear mechanism. In addition, according to this characteristic configuration, the specific portion of the inverter device is accommodated in the space created by placing the counter gear mechanism in a lower position as described above. Specifically, the specific portion of the inverter device is disposed between the rotary electric machine and the fourth gear in the axial direction, at such a position that the specific portion overlaps the counter gear mechanism as seen in the up-down direction and overlaps the rotary electric machine as seen in the axial direction. By appropriately placing the inverter device in the space created by layout of the members in this way, it is possible to suppress the increase in size of the vehicle drive device in the radial direction.

BRIEF DESCRIPTION OF THE DRAWINGS

FIG. 3 is a diagram showing a positional relationship between a rotary electric machine, an input member, a counter gear mechanism, a differential gear mechanism, and an inverter device.

FIG. 4 is a plan view showing the inverter device accommodated in a third accommodating portion.

MODES FOR CARRYING OUT THE DISCLOSURE

Figure 1:
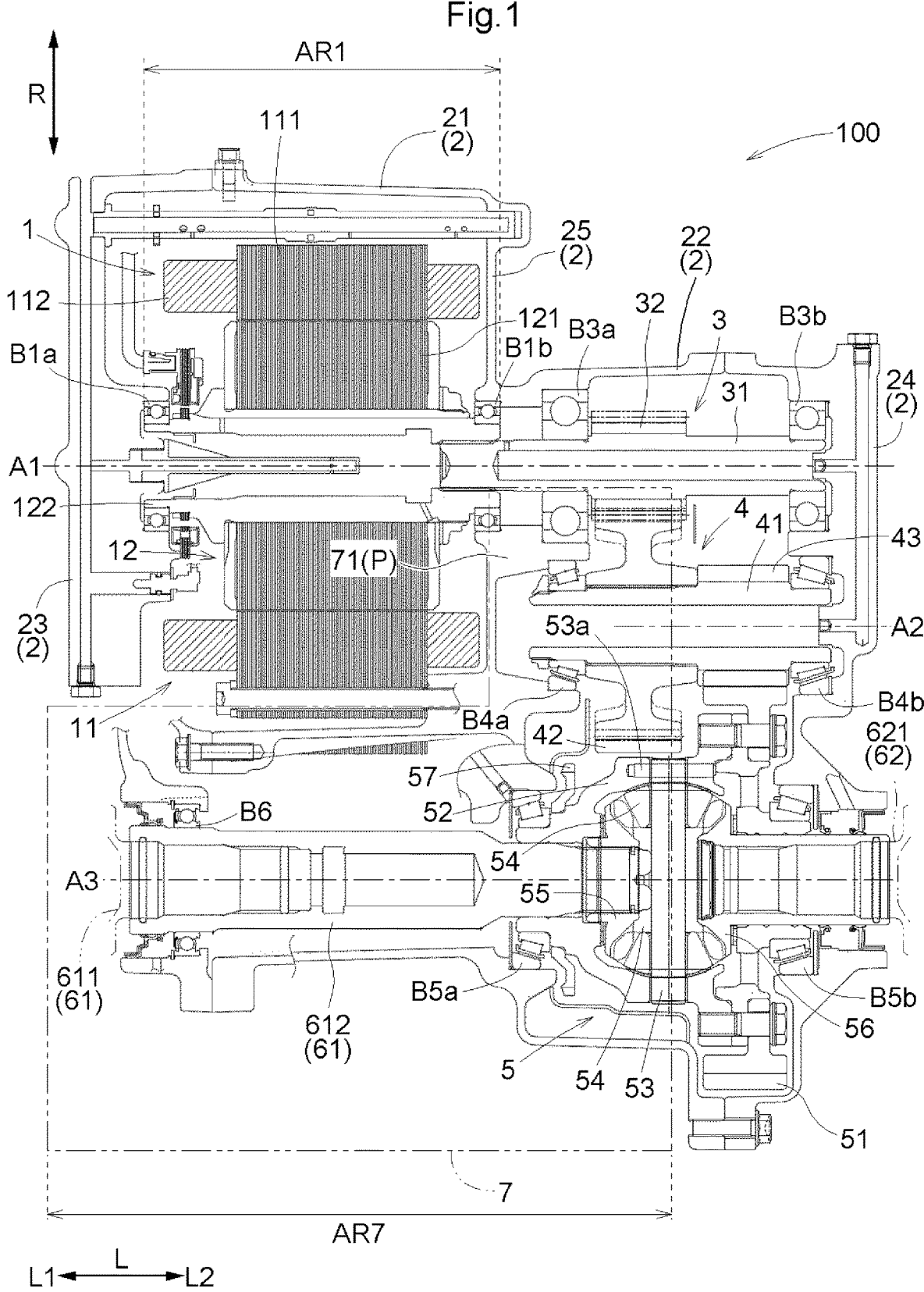
FIG. 1 is a sectional view taken along an axial direction of a vehicle drive device according to an embodiment.
Figure 2:
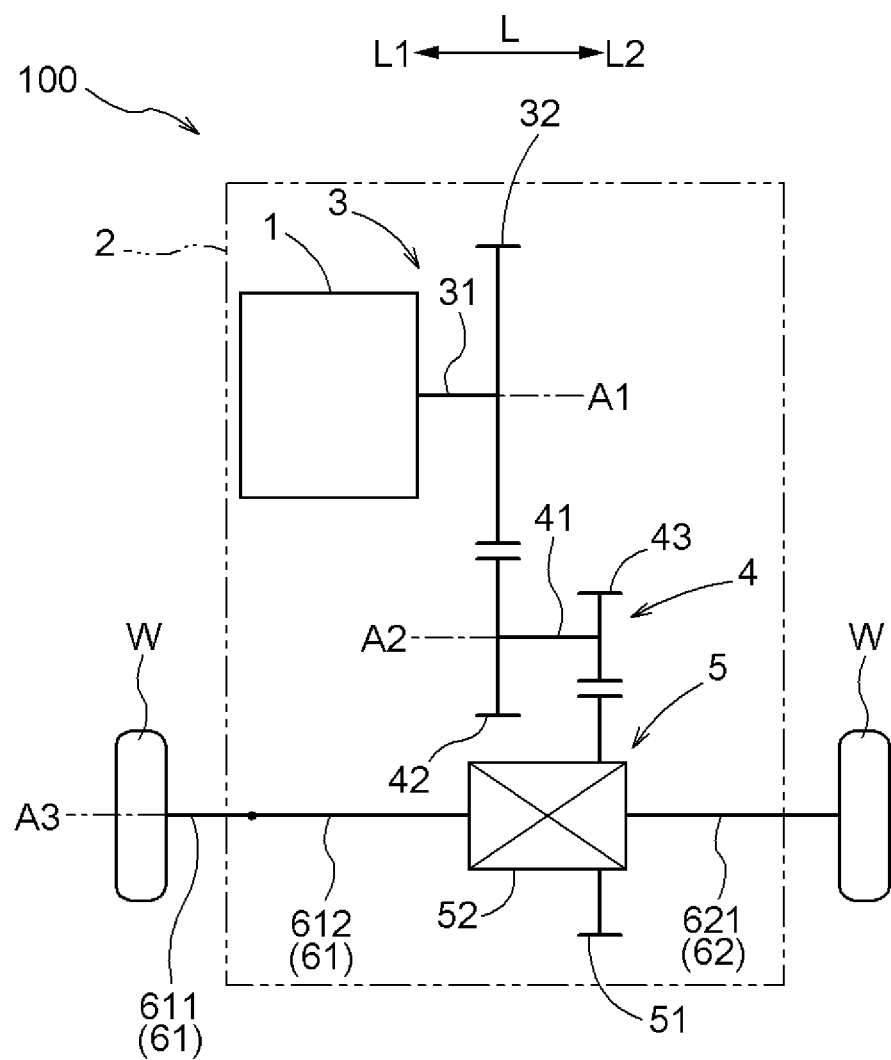
FIG. 2 is a skeleton diagram of the vehicle drive device according to the embodiment.

Hereinafter, a vehicle drive device 100 according to an embodiment will be described with reference to the drawings. As shown in FIGS. 1 and 2, the vehicle drive device 100 includes: a rotary electric machine 1; an input member 3; a counter gear mechanism 4; a differential gear mechanism 5; a first output member 61; and a second output member 62. In the present embodiment, the rotary electric machine 1, the input member 3, the counter gear mechanism 4, and the differential gear mechanism 5 are accommodated in a case 2.

Each of the rotary electric machine 1 and the input member 3 is disposed on a first axis A1 serving as its rotation axis. That is, the rotary electric machine 1 is disposed coaxially with the input member 3. The counter gear mechanism 4 is disposed on a second axis A2 serving as a rotation axis of the counter gear mechanism 4. The differential gear mechanism 5 is disposed on a third axis A3 serving as a rotation axis of the differential gear mechanism 5. In the present embodiment, the first output member 61 and the second output member 62 are also arranged on the third axis A3. The first axis A1, the second axis A2, and the third axis A3 are virtual axes that are different from each other and are arranged in parallel with each other.

In the following description, the direction parallel to the axes A1 to A3 will be referred to as an "axial direction L" of the vehicle drive device 100. In the axial direction L, the side, with respect to the input member 3, on which the rotary electric machine 1 is disposed will be referred to as a "first side L1 in the axial direction", and the opposite side will be referred to as a "second side L2 in the axial direction". Further, the direction orthogonal to each of the first axis A1, the second axis A2, and the third axis A3 will be referred to as a "radial direction R" with respect to each axis. When it is not necessary to distinguish which axis is used as a reference, or when it is clear which axis is used as a reference, the direction may be simply referred to as a "radial direction R".

As shown in FIG. 1, in the present embodiment, the case 2 has a first peripheral wall portion 21, a second peripheral wall portion 22, a first side wall portion 23, a second side wall portion 24, and a partition wall portion 25.

The first peripheral wall portion 21 has a tubular shape that surrounds the outside of the rotary electric machine 1 in the radial direction R. The second peripheral wall portion 22 has a tubular shape that surrounds the outside of the input member 3, the counter gear mechanism 4, and the differential gear mechanism 5 in the radial direction R. The first side wall portion 23 and the second side wall portion 24 are provided so as to extend along the radial direction R. The first side wall portion 23 is fixed to an end portion of the first peripheral wall portion 21 on the first side L1 in the axial direction so as to close the opening of the first peripheral wall portion 21 on the first side L1 in the axial direction. The second side wall portion 24 is fixed to an end portion of the second peripheral wall portion 22 on the second side L2 in the axial direction so as to close the opening of the second peripheral wall portion 22 on the second side L2 in the axial direction. The partition wall portion 25 is formed so as to partition, in the axial direction L, a space inside the first peripheral wall portion 21 in the radial direction R and a space inside the second peripheral wall portion 22 in the radial direction R.

The rotary electric machine 1 functions as a driving force source for a pair of wheels W. The rotary electric machine 1 has a stator 11 and a rotor 12. The "rotary electric machine" is used as a concept including any of a motor (electric motor), a generator, and a motor generator that functions as both a motor and a generator as necessary.

The stator 11 has a stator core 111 fixed to a non-rotating member (for example, the case 2). The rotor 12 has a rotor core 121 that is rotatable with respect to the stator 11, and a rotor shaft 122 that is connected to the rotor core 121 so as to rotate integrally with the rotor core 121. In the present embodiment, the rotary electric machine 1 is a revolving field-type rotary electric machine. Therefore, a coil is wound around the stator core 111 such that coil end portions 112 are provided that protrude from the stator core 111 to both sides in the axial direction L (the first side L1 in the axial direction and the second side L2 in the axial direction). Permanent magnets 123 are provided in the rotor core 121. Further, in the present embodiment, the rotary electric machine 1 is an inner rotor type rotary electric machine. Therefore, the rotor core 121 is disposed inside the stator core 111 in the radial direction R. The rotor shaft 122 is connected to the inner peripheral surface of the rotor core 121.

The rotor shaft 122 is a rotating member that rotates around the first axis A1. The rotor shaft 122 is provided so as to extend along the axial direction L. In the present embodiment, the rotor shaft 122 is rotatably supported with respect to the case 2 via a first rotor bearing B1a and a second rotor bearing B1b. Specifically, the end portion of the rotor shaft 122 on the first side L1 in the axial direction is rotatably supported with respect to the first side wall portion 23 of the case 2 via the first rotor bearing B1a. The end portion of the rotor shaft 122 on the second side L2 in the axial direction is rotatably supported with respect to the partition wall portion 25 of the case 2 via the second rotor bearing B1b.

The input member 3 is drivingly connected to the rotary electric machine 1. The input member 3 has an input shaft 31 and an input gear 32.

The input shaft 31 is a rotating member that rotates around the first axis A1. The input shaft 31 is disposed so as to extend to the second side L2 in the axial direction from the rotary electric machine 1. The input gear 32 is provided so as to protrude outward from the input shaft 31 in the radial direction R. That is, the rotary electric machine 1 is disposed on the first side L1 in the axial direction with respect to the input gear 32. In the present embodiment, the input shaft 31 is inserted into a through hole that passes through the partition wall portion 25 of the case 2 in the axial direction L. The end portion of the input shaft 31 on the first side L1 in the axial direction is connected to the end portion of the rotor shaft 122 on the second side L2 in the axial direction. In the illustrated example, the end portion of the input shaft 31 on the first side L1 in the axial direction is inserted to the end portion of the rotor shaft 122 on the second side L2 in the axial direction such that the input shaft 31 is located inside the rotor shaft 122 in the radial direction R, and the end portions are connected to each other by spline engagement.

In the present embodiment, the input shaft 31 is rotatably supported with respect to the case 2 via a first input bearing B3a and a second input bearing B3b. Specifically, a portion of the input shaft 31 more toward the first side L1 in the axial direction than the central portion of the input shaft 31 in the axial direction L and more toward the second side L2 in the axial direction than the connecting portion with the rotor shaft 122 is rotatably supported with respect to the partition wall portion 25 of the case 2 via the first input bearing B3a. The end portion of the input shaft 31 on the second side L2 in the axial direction is rotatably supported with respect to the second side wall portion 24 of the case 2 via the second input bearing B3b.

The input gear 32 corresponds to the "first gear". The input gear 32 transmits the driving force from the rotary electric machine 1 to the counter gear mechanism 4. The input gear 32 is connected to the input shaft 31 so as to rotate integrally with the input shaft 31. In the present embodiment, the input gear 32 is formed integrally with the input shaft 31. Further, in the present embodiment, the input gear 32 is disposed between the first input bearing B3a and the second input bearing B3b.

The counter gear mechanism 4 is disposed between the input member 3 and the differential gear mechanism 5 in a power transmission path connecting the rotary electric machine 1 and the pair of wheels W. The counter gear mechanism 4 has a counter shaft 41, a first counter gear 42, and a second counter gear 43.

The counter shaft 41 is a rotating member that rotates around the second axis A2. The counter shaft 41 is provided so as to extend along the axial direction L. In the present embodiment, the counter shaft 41 is rotatably supported with respect to the case 2 via a first counter bearing B4a and a second counter bearing B4b. Specifically, the end portion of the counter shaft 41 on the first side L1 in the axial direction is rotatably supported with respect to the partition wall portion 25 of the case 2 via the first counter bearing B4a. The end portion of the counter shaft 41 on the second side L2 in the axial direction is rotatably supported with respect to the second side wall portion 24 of the case 2 via the second counter bearing B4b.

The first counter gear 42 is an input element of the counter gear mechanism 4. The first counter gear 42 meshes with the input gear 32 of the input member 3. That is, the first counter gear 42 corresponds to the "second gear" that meshes with the first gear. The first counter gear 42 is connected to the counter shaft 41 so as to rotate integrally with the counter shaft 41. In the present embodiment, the first counter gear 42 is connected to the counter shaft 41 by spline engagement.

The second counter gear 43 is an output element of the counter gear mechanism 4. The second counter gear 43 is disposed more toward the second side L2 in the axial direction than the first counter gear 42. The second counter gear 43 is connected to the counter shaft 41 so as to rotate integrally with the counter shaft 41. That is, the second counter gear 43 corresponds to the "third gear" that integrally rotates with the second gear. In the present embodiment, the second counter gear 43 is formed integrally with the counter shaft 41. In the present embodiment, the second counter gear 43 has a smaller diameter than the first counter gear 42.

The differential gear mechanism 5 distributes the driving force transmitted from the rotary electric machine 1 side to the first output member 61 and the second output member 62. In the present embodiment, the differential gear mechanism 5 includes a differential input gear 51, a differential case 52, a pinion shaft 53, a pair of pinion gears 54, a first side gear 55, and a second side gear 56. In the present embodiment, the pair of pinion gears 54, the first side gear 55, and the second side gear 56 are all bevel gears.

The differential input gear 51 is an input element of the differential gear mechanism 5. The differential input gear 51 meshes with the second counter gear 43 of the counter gear mechanism 4. That is, the differential input gear 51 corresponds to the "fourth gear" that meshes with the third gear. As described above, the second counter gear 43 is disposed more toward the second side L2 in the axial direction than the first counter gear 42. The first counter gear 42 meshes with the input gear 32 of the input member 3. Therefore, the second counter gear 43 of the counter gear mechanism 4 and the differential input gear 51 are disposed more toward the second side L2 in the axial direction than the input gear 32 and the first counter gear 42.

The differential case 52 is a rotating member that rotates around the third axis A3. The differential case 52 is connected to the differential input gear 51 so as to rotate integrally with the differential input gear 51. In the present embodiment, the differential case 52 is rotatably supported with respect to the case 2 via a first differential bearing B5a and a second differential bearing B5b. Specifically, the end portion of the differential case 52 on the first side L1 in the axial direction is rotatably supported with respect to the partition wall portion 25 of the case 2 via the first differential bearing B5a. The end portion of the differential case 52 on the second side L2 in the axial direction is rotatably supported with respect to the second side wall portion 24 of the case 2 via the second differential bearing B5b.

In the present embodiment, a pump drive gear 57 is connected to the differential case 52. The pump drive gear 57 is a gear for driving a hydraulic pump (not shown) that pumps up and discharges the oil stored in the storage portion in the case 2. Specifically, the pump drive gear 57 is a gear that meshes with a pump input gear (not shown) that is an input element of the hydraulic pump. The pump drive gear 57 is connected to the differential case 52 so as to rotate integrally with the differential case 52. The pump drive gear 57 is provided so as to protrude outward from the outer peripheral surface of the differential case 52 in the radial direction R. In the present embodiment, the pump drive gear 57 is disposed more toward the first side L1 in the axial direction than the differential input gear 51. In the present embodiment, the pump drive gear 57 has a smaller diameter than the differential input gear 51.

The differential case 52 is a hollow member. Inside the differential case 52, the pinion shaft 53, the pair of pinion gears 54, the first side gear 55, and the second side gear 56 are accommodated.

The pinion shaft 53 extends along the radial direction R with respect to the third axis A3. The pinion shaft 53 is inserted into the pair of pinion gears 54 and supports the pinion gears 54 such that the pinion gears 54 are rotatable. The pinion shaft 53 is disposed so as to pass through the differential case 52. The pinion shaft 53 is locked to the differential case 52 by a locking member 53a and rotates integrally with the differential case 52. In the illustrated example, the locking member 53a is a rod-shaped pin inserted into both the differential case 52 and the pinion shaft 53.

The pair of pinion gears 54 is attached to the pinion shaft 53 such that the pinion gears 54 face each other while being spaced along the radial direction R with respect to the third axis A3. The pair of pinion gears 54 is configured to be able to rotate about the pinion shaft 53 and able to rotate (revolve) about the third axis A3.

The first side gear 55 and the second side gear 56 are rotation elements after distribution of the driving force in the differential gear mechanism 5. The first side gear 55 and the second side gear 56 are arranged so as to face each other with the pinion shaft 53 interposed therebetween while being spaced in the axial direction L. The first side gear 55 is disposed more toward the first side L1 in the axial direction than the second side gear 56. The first side gear 55 and the second side gear 56 are each configured to rotate in the circumferential direction in the internal space of the differential case 52. The first side gear 55 and the second side gear 56 mesh with the pair of pinion gears 54. The first side gear 55 is connected to the first output member 61 so as to rotate integrally with the first output member 61. The second side gear 56 is connected to the second output member 62 so as to rotate integrally with the second output member 61.

Each of the first output member 61 and the second output member 62 is drivingly connected to the wheel W. Each of the first output member 61 and the second output member 62 transmits the driving force distributed by the differential gear mechanism 5 to the wheel W.

In the present embodiment, the first output member 61 includes a first axle 611 and a relay member 612. Each of the first axle 611 and the relay member 612 is a rotating member that rotates around the third axis A3. The first axle 611 is drivingly connected to the wheel W on the first side L1 in the axial direction. The relay member 612 is a shaft member extending in the axial direction L. The relay member 612 is inserted into a through hole that passes through the partition wall portion 25 of the case 2 in the axial direction L. The relay member 612 is rotatably supported with respect to the first side wall portion 23 of the case 2 via an output bearing B6.

The end portion of the relay member 612 on the first side L1 in the axial direction is exposed to the outside of the case 2 through a through hole passing through the first side wall portion 23 of the case 2 in the axial direction L. The end portion of the relay member 612 on the first side L1 in the axial direction is connected to the first axle 611 so as to rotate integrally with the first axle 611. In the present embodiment, the relay member 612 has a tubular shape with the end surface on the first side L1 in the axial direction being open. The inner peripheral surface of the relay member 612 and the outer peripheral surface of the end portion of the first axle 611 on the second side L2 in the axial direction are provided with corresponding splines. The relay member 612 and the first axle 611 are connected so as to rotate integrally when the splines are engaged with each other.

On the other hand, the end portion of the relay member 612 on the second side L2 in the axial direction is connected to the first side gear 55 of the differential gear mechanism 5 so as to rotate integrally with the first side gear 55. In the present embodiment, the outer peripheral surface of the end portion of the relay member 612 on the second side L2 in the axial direction and the inner peripheral surface of the first side gear 55 are provided with corresponding splines. The relay member 612 and the first side gear 55 are connected so as to rotate integrally when the splines are engaged with each other.

In the present embodiment, the second output member 62 includes a second axle 621. The second axle 621 is a rotating member that rotates around the third axis A3. The second axle 621 is drivingly connected to the wheel W on the second side L2 in the axial direction. The second axle 621 is connected to the second side gear 56 so as to rotate integrally with the second side gear 56. In the present embodiment, the outer peripheral surface of the end portion of the second axle 621 on the first side L1 in the axial direction and the inner peripheral surface of the second side gear 56 are provided with corresponding splines. The second axle 621 and the second side gear 56 are connected so as to rotate integrally when the splines are engaged with each other.

As shown in FIG. 1, the vehicle drive device 100 includes an inverter device 7. The inverter device 7 is a device that controls the rotary electric machine 1. The inverter device 7 is connected to a power storage device (not shown) and the rotary electric machine 1 so as to convert electric power between direct current of the power storage device and alternating current of a plurality of phases (here, three phases) of the rotary electric machine 1. In the present embodiment, the inverter device 7 is accommodated in the case 2.

Hereinafter, the positional relationship of the elements accommodated in the case 2 will be described. In the following description, the vertical direction of the vehicle drive device 100 mounted on the vehicle will be referred to as an "up-down direction V". The upper position in the up-down direction V is represented by using "up", for example, above, upper end, and the like, and the lower position in the up-down direction V is represented by using "down", for example, below, lower end, and the like. Furthermore, the direction orthogonal to the axial direction L as seen in an up-down direction along the up-down direction V will be referred to as a "depth direction D". In the depth direction D, the differential gear mechanism 5 side with respect to the rotary electric machine 1 will be referred to as a "front side D1", and the opposite side from the front side D1 will be referred to as a "rear side D2".

As shown in FIG. 3, the axis (A2) of the counter gear mechanism 4 is disposed below both the axis (A1) of the rotary electric machine 1 and the axis (A3) of the differential gear mechanism 5. In the example shown in FIG. 3, the first axis A1, the second axis A2, and the third axis A3 are arranged in the order of the first axis A1, the third axis A3, and the second axis A2 from above.

In the present embodiment, the axis (A2) of the counter gear mechanism 4 is disposed between the axis (A1) of the rotary electric machine 1 and the axis (A3) of the differential gear mechanism 5 in the depth direction D.

As shown as an arrangement area by a long dashed double-short dashed line in FIG. 1, the inverter device 7 is disposed more toward the first side L1 in the axial direction than the differential input gear 51 of the differential gear mechanism 5. The inverter device 7 is disposed above the axis (A3) of the differential gear mechanism 5. As shown in FIG. 3, the inverter device 7 is disposed at such a position that the inverter device 7 overlaps the differential input gear 51 as seen in the axial direction along the axial direction L. Here, regarding the arrangement of two elements, "overlap as seen in a specific direction" means that when a virtual straight line parallel to the direction of line of sight is moved in directions orthogonal to the virtual straight line, there is an area where the virtual straight line intersects both the two elements in at least one of the directions. In FIG. 3, the outer shapes of the input gear 32 and the first counter gear 42 are shown by broken lines, and the outer shapes of the differential input gear 51 and the second counter gear 43 are shown by a long dashed short dashed line.

As shown in FIG. 1, a specific portion P of the inverter device 7 is disposed between the rotary electric machine 1 and the differential input gear 51 in the axial direction L. The specific portion P of the inverter device 7 is disposed at such a position that the specific portion P overlaps the counter gear mechanism 4 as seen in the up-down direction along the up-down direction V.

As shown in FIG. 3, the inverter device 7 is also disposed at such a position that the specific portion P overlaps the rotary electric machine 1 as seen in the axial direction along the axial direction L. As shown in FIG. 4, in the present embodiment, the specific portion P is a protruding portion 71 of the inverter device 7, which protrudes in the depth direction D from the portion of the inverter device 7 excluding the specific portion P. In the illustrated example, the protruding portion 71 protrudes to the rear side D2 from the portion of the inverter device 7 excluding the specific portion P. The protruding portion 71 is a part of elements constituting the inverter device 7 (for example, a power module, a smoothing capacitor, and the like).

As shown in FIG. 1, in the present embodiment, the inverter device 7 is disposed so that an arrangement area AR7 of the inverter device 7 in the axial direction L and an arrangement area AR1 of the rotary electric machine 1 in the axial direction L overlap. That is, the inverter device 7 is disposed so that at least a part of the arrangement area AR7 of the inverter device 7 in the axial direction L is included in the arrangement area AR1 of the rotary electric machine 1 in the axial direction L. In the illustrated example, the dimension of the inverter device 7 in the axial direction L is larger than the dimension of the rotary electric machine 1 in the axial direction L, and the arrangement area AR1 of the rotary electric machine 1 in the axial direction L is completely included in the arrangement area AR7 of the inverter device 7 in the axial direction L.

As shown in FIG. 3, in the present embodiment, a counter gear lower end 4a that is the lowermost end of the counter gear mechanism 4 is disposed at the same position as or above, in the up-down direction V, a differential gear lower end 5a that is the lowermost end of the differential gear mechanism 5. In the illustrated example, the counter gear lower end 4a is disposed above the differential gear lower end 5a. In the present embodiment, the counter gear lower end 4a is the lower end of the first counter gear 42. The differential gear lower end 5a is the lower end of the differential input gear 51.

Also, in the present embodiment, an inverter upper end 7a that is the uppermost end of the inverter device 7 is disposed at the same position as or below, in the up-down direction V, a rotary electric machine upper end 1a that is the uppermost end of the rotary electric machine 1. In the illustrated example, the inverter upper end 7a and the rotary electric machine upper end 1a are disposed at the same position in the up-down direction V. In the present embodiment, the rotary electric machine upper end 1a is the upper end of the outer peripheral surface of the stator core 111.

As shown in FIG. 3, in the present embodiment, the case 2 includes a first accommodating portion 2A for accommodating the rotary electric machine 1, a second accommodating portion 2B for accommodating the differential gear mechanism 5, and a third accommodating portion 2C for accommodating the inverter device 7. In the present embodiment, the first accommodating portion 2A, the second accommodating portion 2B, and the third accommodating portion 2C are integrally provided. In the present embodiment, the first accommodating portion 2A, the second accommodating portion 2B, and the third accommodating portion 2C are configured as one member. In the present embodiment, the first accommodating portion 2A is composed of a part of the first peripheral wall portion 21, a part of the first side wall portion 23, and a part of the partition wall portion 25. The second accommodating portion 2B is composed of a part of the second peripheral wall portion 22, a part of the second side wall portion 24, and a part of the partition wall portion 25. The third accommodating portion 2C is provide with an opening at the upper portion such that the inverter device 7 can be stored from above. This opening is closed by a lid member (not shown) with the inverter device 7 accommodated in the third accommodating portion 2C.

In the present embodiment, the inverter device 7 is disposed below the upper one of a first uppermost end 2Aa and a second uppermost end 2Ba. The first uppermost end 2Aa is the uppermost end of the first accommodating portion 2A and the second uppermost end 2Ba is the uppermost end of the second accommodating portion 2B. In the illustrated example, the first uppermost end 2Aa is located above the second uppermost end 2Ba. The inverter device 7 is disposed below the first uppermost end 2Aa. Also, in the present embodiment, the inverter device 7 is disposed between a first outermost depth end 2Ab that is the outermost end of the first accommodating portion 2A and a second outermost depth end 2Bb that is the outermost end of the second accommodating portion 2B, in the depth direction D. In other words, the inverter device 7 is disposed between the outermost ends of the first accommodating portion 2A and the second accommodating portion 2B in the depth direction D. In the illustrated example, the first outermost depth end 2Ab is the outermost end of the first accommodating portion 2A on the rear side D2. The second outermost depth end 2Bb is the outermost end of the second accommodating portion 2B on the front side D1.

As shown in FIG. 4, in the present embodiment, the inverter device 7 is disposed between a first outermost axial end 2Ac that is the outermost end of the first accommodating portion 2A and a second outermost axial end 2Bc that is the outermost end of the second accommodating portion 2B, in the axial direction L. In other words, the inverter device 7 is disposed between the outermost ends of the first accommodating portion 2A and the second accommodating portion 2B in the axial direction L. In the illustrated example, the first outermost axial end 2Ac is the outermost end of the first accommodating portion 2A on the first side L1 in the axial direction. The second outermost axial end 2Bc is the outermost end of the second accommodating portion 2B on the second side L2 in the axial direction.

In the present embodiment, the vehicle drive device 100 configured as described above is disposed below at least one of a luggage compartment and a cabin of the vehicle when mounted on the vehicle. Specifically, in the present embodiment, the vehicle drive device 100 is disposed in at least one of: a space located below the luggage compartment in the vehicle and overlapping the luggage compartment as seen in the up-down direction along the up-down direction V; and a space located below the cabin in the vehicle and overlapping the cabin as seen in the up-down direction. Here, the luggage compartment is a part, in the vehicle, provided with a space for loading luggage. The luggage compartment includes a loading platform with its upper part being open. In addition, the cabin is a space in which seats for passengers are arranged. The cabin also includes a configuration with its upper part being open.

OTHER EMBODIMENTS (1) In the above embodiment, the configuration in which the arrangement area AR7 of the inverter device 7 in the axial direction L and the arrangement area AR1 of the rotary electric machine 1 in the axial direction L overlap each other has been described as an example. However, the configuration is not limited to such a configuration, and the arrangement area AR7 of the inverter device 7 in the axial direction L and the arrangement area AR1 of the rotary electric machine 1 in the axial direction L do not have to overlap. For example, the inverter device 7 may be disposed more toward the first side L1 in the axial direction than the rotary electric machine 1. Alternatively, the inverter device 7 may be disposed between the rotary electric machine 1 and the differential input gear 51 in the axial direction L.

(2) In the above embodiment, the configuration in which the protruding portion 71 protrudes to the rear side D2 from the portion of the inverter device 7 excluding the specific portion P has been described as an example. However, the configuration is not limited to such a configuration, and the protruding portion 71 may protrude to the front side D1 from the portion of the inverter device 7 excluding the specific portion P.

(3) In the above embodiment, the configuration in which the first uppermost end 2Aa is located above the second uppermost end 2Ba and the inverter device 7 is disposed below the first uppermost end 2Aa has been described as an example. However, the configuration is not limited to such a configuration, and for example, the second uppermost end 2Ba may be located above the first uppermost end 2Aa, and the inverter device 7 may be disposed below the second uppermost end 2Ba. Alternatively, the inverter device 7 may be disposed so as to protrude upward from the upper one of the first uppermost end 2Aa and the second uppermost end 2Ba.

(4) In the above embodiment, the configuration in which the inverter device 7 is disposed between the first outermost depth end 2Ab and the second outermost depth end 2Bb in the depth direction D has been described as an example. However, the configuration is not limited to such a configuration, and the inverter device 7 may be disposed so as to protrude outward in the depth direction D from at least one of the first outermost depth end 2Ab and the second outermost depth end 2Bb.

(5) In the above embodiment, the configuration in which the inverter device 7 is disposed between the first outermost axial end 2Ac and the second outermost axial end 2Bc in the axial direction L has been described as an example. However, the configuration is not limited to such a configuration, and the inverter device 7 may be disposed so as to protrude outward in the axial direction L from at least one of the first outermost axial end 2Ac and the second outermost axial end 2Bc.

(6) In the above embodiment, the configuration in which the first accommodating portion 2A, the second accommodating portion 2B, and the third accommodating portion 2C are integrally provided has been described as an example. However, the configuration is not limited to such a configuration, and one or more of the first accommodating portion 2A, the second accommodating portion 2B, and the third accommodating portion 2C may be made of different members.

(7) In the above embodiment, the configuration in which the inverter upper end 7a is disposed at the same position as or below the rotary electric machine upper end 1a in the up-down direction V has been described as an example. However, the configuration is not limited to such a configuration, and the inverter upper end 7a may be disposed above the rotary electric machine upper end 1a.

(8) In the above embodiment, the configuration in which the counter gear lower end 4a of the counter gear mechanism 4 is disposed at the same position as or above the differential gear lower end 5a of the differential gear mechanism 5 in the up-down direction V has been described as an example. However, the configuration is not limited to such a configuration, and the counter gear lower end 4a may be disposed below the differential gear lower end 5a.

(9) In the above embodiment, the configuration in which the pump drive gear 57 that meshes with the pump input gear of the hydraulic pump is provided in the differential case 52 has been described as an example. However, the configuration is not limited to such a configuration, and for example, the pump drive gear 57 may be provided on the counter shaft 41. Alternatively, a configuration may be adopted in which the pump drive gear 57 is not provided and the pump input gear meshes with the first counter gear 42 or the differential input gear 51. Moreover, a configuration may be adopted in which the hydraulic pump is not provided with the pump input gear, the pump drive shaft connected to the rotor of the hydraulic pump is connected to the counter shaft 41 so as to rotate integrally with the counter shaft 41, and the hydraulic pump is driven by the rotation of the counter shaft 41. Alternatively, a configuration may be adopted in which the hydraulic pump is driven by a driving force source dedicated to driving the pump, such as an electric motor, independently of the power transmission path of the vehicle drive device 100.

(10) The configuration disclosed in each of the above-described embodiments can be applied in combination with the configurations disclosed in other embodiments as long as there is no contradiction. With respect to other configurations, the embodiments disclosed herein are merely exemplary in all respects. Therefore, various modifications can be made as appropriate without departing from the scope of the present disclosure.

OUTLINE OF EMBODIMENTS DESCRIBED ABOVE

Hereinafter, the outline of the vehicle drive device (100) described above will be described.

A vehicle drive device (100) includes:
- a rotary electric machine (1) serving as a driving force source for a wheel (W);
- an input member (3) having a first gear (32) and drivingly connected to the rotary electric machine (1);
- a pair of output members (61, 62) each drivingly connected to the wheel (W);
- a counter gear mechanism (4) having a second gear (42) that meshes with the first gear (32) and a third gear (43) that rotates integrally with the second gear (42);
- a differential gear mechanism (5) having a fourth gear (51) that meshes with the third gear (43) and distributing rotation of the fourth gear (51) to the pair of output members (61, 62); and
- an inverter device (7) that controls the rotary electric machine (1).

The rotary electric machine (1) is disposed coaxially with the input member (3) and is disposed more toward a first side (L1) in an axial direction than the first gear (32), the first side (L1) being one side of the rotary electric machine (1) in the axial direction (L);

the third gear (43) and the fourth gear (51) are disposed more toward a second side (L2) in the axial direction than the first gear (32) and the second gear (42), the second side (L2) being another side in the axial direction (L);

an axis (A2) of the counter gear mechanism (4) is disposed below both an axis (A1) of the rotary electric machine (1) and an axis (A3) of the differential gear mechanism (5);

the inverter device (7) is disposed more toward the first side (L1) in the axial direction than the fourth gear (51) and above the axis (A3) of the differential gear mechanism (5) while being disposed at such a position that the inverter device (7) overlaps the fourth gear (51) as seen in an axial direction along the axial direction (L); and a specific portion (P) of the inverter device (7) is disposed between the rotary electric machine (1) and the fourth gear (51) in the axial direction (L), at such a position that the specific portion (P) overlaps the counter gear mechanism (4) as seen in an up-down direction along an up-down direction (V) and overlaps the rotary electric machine (1) as seen in the axial direction.

Generally, the fourth gear (51) of the differential gear mechanism (5) has a larger dimension in the radial direction (R) than the first gear (32) of the input member (3) and the second gear (42) and the third gear (43) of the counter gear mechanism (4). According to this configuration, the inverter device (7) is disposed at such a position that the inverter device (7) overlaps the fourth gear (51) as seen in the axial direction along the axial direction (L). Accordingly, it is possible to suppress the increase in dimension of the vehicle drive device (100) in the radial direction (R) due to the placement of the inverter device (7).

Further, according to this configuration, the third gear (43) and the fourth gear (51) are disposed more toward the second side (L2) in the axial direction than the rotary electric machine (1), the first gear (32), and the second gear (42). That is, the third gear (43) and the fourth gear (51) are disposed closer to the second side (L2) in the axial direction in the vehicle drive device (100). This facilitates securing a space for placing the inverter device (7) more toward the first side (L1) in the axial direction than the fourth gear (51) having a relatively large diameter, outside the rotary electric machine (1), the first gear (32), and the second gear (42) in the radial direction (R).

This configuration also facilitates securing a space for placing the inverter device (7) above the axis (A3) of the differential gear mechanism (5), compared with the case where the axis (A2) of the counter gear mechanism (4) is disposed above at least one of the axis (A1) of the rotary electric machine (1) and the axis (A3) of the differential gear mechanism (5). In addition, according to this configuration, the specific portion (P) of the inverter device (7) is accommodated in the space created by placing the counter gear mechanism (4) in a lower position as described above. Specifically, the specific portion (P) of the inverter device (7) is disposed between the rotary electric machine (1) and the fourth gear (51) in the axial direction (L), at such a position that the specific portion (P) overlaps the counter gear mechanism (4) as seen in the up-down direction and overlaps the rotary electric machine (1) as seen in the axial direction. By appropriately placing the inverter device (7) in the space created by layout of the members in this way, it is possible to suppress the increase in size of the vehicle drive device (100) in the radial direction (R).

It is preferable that the specific portion (P) of the inverter device (7) be a protruding portion (71) protruding in a direction (D) orthogonal to the axial direction (L) as seen in the up-down direction, from a portion of the inverter device (7) excluding the specific portion (P).

According to this configuration, even when the inverter device (7) has the protruding portion (71) protruding in the direction (D) orthogonal to the axial direction (L) as seen in the up-down direction, the protruding portion (71) of the inverter device (7) can be disposed using a space between the rotary electric machine (1) and the fourth gear (51) in the axial direction (L), which overlaps the counter gear mechanism (4) as seen in the up-down direction and overlaps the rotary electric machine (1) as seen in the axial direction. Thus, it is possible to suppress the increase in size of the vehicle drive device (100) in the direction (D) orthogonal to the axial direction (L) as seen in the up-down direction due to the placement of the inverter device (7).

It is also preferable that the inverter device (7) be disposed such that an arrangement area (AR7) of the inverter device (7) in the axial direction (L) and an arrangement area (AR1) of the rotary electric machine (1) in the axial direction (L) overlap.

According to this configuration, the inverter device (7) is disposed using the space that the arrangement area in the axial direction (L) overlaps the rotary electric machine (1). Thus, it is possible to suppress the increase in size of the vehicle drive device (100) in the axial direction (L) due to the placement of the inverter device (7).

In the configuration in which the axis (A2) of the counter gear mechanism (4) is disposed below both the axis (A1) of the rotary electric machine (1) and the axis (A3) of the differential gear mechanism (5), it is preferable that a lowermost end (4a) of the counter gear mechanism (4) be disposed at the same position as or above a lowermost end (5a) of the differential gear mechanism (5) in the up-down direction (V).

According to this configuration, the counter gear mechanism (4) does not protrude below the differential gear mechanism (5). This facilitates securing the minimum clearance from the ground when the vehicle drive device (100) is mounted on the vehicle.

It is also preferable that the vehicle drive device (100) further include a case (2) for accommodating the rotary electric machine (1), the input member (3), the counter gear mechanism (4), the differential gear mechanism (5), and the inverter device (7), wherein:

with a direction orthogonal to the axial direction (L) as seen in the up-down direction being defined as a depth direction (D), in the depth direction (D), the axis (A2) of the counter gear mechanism (4) is disposed between the axis (A1) of the rotary electric machine (1) and the axis (A3) of the differential gear mechanism (5);

the case (2) includes a first accommodating portion (2A) for accommodating the rotary electric machine (1) and a second accommodating portion (2B) for accommodating the differential gear mechanism (5); and the inverter device (7) is disposed below an upper one of an uppermost end (2Aa) of the first accommodating portion (2A) and an uppermost end (2Ba) of the second accommodating portion (2B), between an outermost end (2Ab) of the first accommodating portion (2A) and an outermost end (2Bb) of the second accommodating portion (2B) in the depth direction (D).

According to this configuration, the inverter device (7) is disposed so as not to protrude outward from an arrangement area of the first accommodating portion (2A) and the second accommodating portion (2B) in the depth direction (D) and not to protrude upward from an arrangement area of the first accommodating portion (2A) and the second accommodating portion (2B) in the up-down direction (V). Thus, it is possible to suppress the increase in dimension of the vehicle drive device (100) in the depth direction (D) and the up-down direction (V) due to the placement of the inverter device (7).

In the configuration in which the case (2) includes the first accommodating portion (2A) and the second accommodating portion (2B), it is preferable that the inverter device (7) be disposed between an outermost end (2Ac) of the first accommodating portion (2A) and an outermost end (2Bc) of the second accommodating portion (2B) in the axial direction (L).

According to this configuration, the inverter device (7) is disposed so as not to protrude outward from the arrangement area of the first accommodating portion (2A) and the second accommodating portion (2B) in the axial direction (L). Thus, it is possible to suppress the increase in dimension of the vehicle drive device (100) in the axial direction (L) due to the placement of the inverter device (7).

It is also preferable that the case (2) further include a third accommodating portion (2C) for accommodating the inverter device (7), and the first accommodating portion (2A), the second accommodating portion (2B), and the third accommodating portion (2C) be integrally provided.

According to this configuration, as compared with the case where one or more of the first accommodating portion (2A), the second accommodating portion (2B), and the third accommodating portion (2C) are separate members, the number of connecting portions and wall portions of the case (2) can be reduced, and therefore, the case (2) can be easily downsized. Thus, it is possible to suppress the increase in size of the vehicle drive device (100).

It is also preferable that an uppermost end (7a) of the inverter device (7) be disposed at the same position as or below an uppermost end (1a) of the rotary electric machine (1) in the up-down direction (V).

Generally, the uppermost end (1a) of the rotary electric machine (1) is often located above the uppermost end of the counter gear mechanism (4) and the uppermost end of the differential gear mechanism (5). According to this configuration, the inverter device (7) does not protrude upward from the rotary electric machine (1). As a result, it is possible to suppress the increase in dimension of the vehicle drive device (100) in the up-down direction (V) due to the placement of the inverter device (7).

It is also preferable that the vehicle drive device (100) be disposed in at least one of: a space located below a luggage compartment in a vehicle and overlapping the luggage compartment as seen in the up-down direction along the up-down direction; and a space located below a cabin in the vehicle and overlapping the cabin as seen in the up-down direction.

According to this configuration, the vehicle drive device (100) having a small dimension in the radial direction (R) as described above is disposed below at least one of the luggage compartment and the cabin of the vehicle. Thus, even when the vehicle drive device (100) is disposed below the luggage compartment or the cabin of the vehicle, a wide luggage compartment and a wide cabin can be secured.

A vehicle drive device (100) includes:

a rotary electric machine (1) serving as a driving force source for a wheel (W);

an input member (3) having a first gear (32) and drivingly connected to the rotary electric machine (1);

a pair of output members (61, 62) each drivingly connected to the wheel (W);

a counter gear mechanism (4) having a second gear (42) that meshes with the first gear (32) and a third gear (43) that rotates integrally with the second gear (42);

a differential gear mechanism (5) having a fourth gear (51) that meshes with the third gear (43) and distributing rotation of the fourth gear (51) to the pair of output members (61, 62);

an inverter device (7) that controls the rotary electric machine (1); and a case (2) for accommodating the rotary electric machine (1), the input member (3), the counter gear mechanism (4), and the differential gear mechanism (5).

The rotary electric machine (1) is disposed coaxially with the input member (3) and is disposed more toward a first side (L1) in an axial direction than the first gear (32), the first side (L1) being one side of the rotary electric machine (1) in the axial direction (L);

with a direction orthogonal to the axial direction (L) as seen in an up-down direction along an up-down direction (V) being defined as a depth direction (D), in the depth direction (D), an axis (A2) of the counter gear mechanism (4) is disposed between an axis (A1) of the rotary electric machine (1) and an axis (A3) of the differential gear mechanism (5);

the case (2) includes a first accommodating portion (2A) for accommodating the rotary electric machine (1) and a second accommodating portion (2B) for accommodating the differential gear mechanism (5); and the inverter device (7) is disposed below an uppermost end (2Aa) of the first accommodating portion (2A), between an outermost end (2Ab) of the first accommodating portion (2A) and an outermost end (2Bb) of the second accommodating portion (2B) in the depth direction (D).

According to this configuration, the inverter device (7) is disposed so as not to protrude outward from an arrangement area of the first accommodating portion (2A) and the second accommodating portion (2B) in the depth direction (D) and not to protrude upward from an arrangement area of the first accommodating portion (2A) in the up-down direction (V).

Thus, it is possible to suppress the increase in dimension of the vehicle drive device (100) in the depth direction (D) and the up-down direction (V) due to the placement of the inverter device (7).

It is preferable that the inverter device (7) be disposed at such a position that the inverter device (7) overlaps the fourth gear (51) as seen in the axial direction along the axial direction (L).

Generally, the fourth gear (51) of the differential gear mechanism (5) has a larger dimension in the radial direction (R) than the first gear (32) of the input member (3) and the second gear (42) and the third gear (43) of the counter gear mechanism (4). According to this configuration, the inverter device (7) is disposed at such a position that the inverter device (7) overlaps the fourth gear (51) as seen in the axial direction along the axial direction (L). Thus, it is possible to suppress the increase in dimension of the vehicle drive device (100) in the radial direction (R) due to the placement of the inverter device (7).

It is also preferable that the inverter device (7) be disposed at such a position that the inverter device (7) overlaps the rotary electric machine (1) as seen in the axial direction along the axial direction (L).

According to this configuration, it is possible to keep the dimension of the vehicle drive device (100) in the radial direction (R) small, as compared with the configuration in which the inverter device (7) is disposed outside the rotary electric machine (1) in the radial direction (R).

It is also preferable that the axis (A2) of the counter gear mechanism (4) be disposed below both the axis (A1) of the rotary electric machine (1) and the axis (A3) of the differential gear mechanism (5), and the inverter device (7) be disposed at such a position that the inverter device (7) overlaps the counter gear mechanism (4) as seen in the up-down direction.

This configuration facilitates securing a space for placing the inverter device (7) above the axis (A3) of the differential gear mechanism (5), compared with the case where the axis (A2) of the counter gear mechanism (4) is disposed above at least one of the axis (A1) of the rotary electric machine (1) and the axis (A3) of the differential gear mechanism (5). Thus, it is possible to suppress the increase in size of the vehicle drive device (100) in the radial direction (R).

INDUSTRIAL APPLICABILITY

The technique according to the present disclosure can be used for a vehicle drive device including a rotary electric machine serving as a driving force source for wheels, a counter gear mechanism, a differential gear mechanism, and an inverter device for controlling the rotary electric machine.

DESCRIPTION OF THE REFERENCE NUMERALS

100: vehicle drive device
1: rotary electric machine
3: input member
32: input gear (first gear)
4: counter gear mechanism
42: first counter gear (second gear)
43: second counter gear (third gear)
5: differential gear mechanism
51: differential input gear (fourth gear)
61: first output member
62: second output member
7: inverter device
P: specific portion
W: wheel
V: up-down direction
L: axial direction
L1: first side in axial direction
L2: second side in axial direction

The invention claimed is:

1. A vehicle drive device comprising:
a rotary electric machine that serves as a driving force source for a wheel;
an input member having a first gear and drivingly connected to the rotary electric machine;
a pair of output members each drivingly connected to the wheel;
a counter gear mechanism having a second gear that meshes with the first gear and a third gear that rotates integrally with the second gear;
a differential gear mechanism having a fourth gear that meshes with the third gear and distributing rotation of the fourth gear to the pair of output members; and
an inverter device that controls the rotary electric machine, wherein:
the rotary electric machine is disposed coaxially with the input member and is disposed more toward a first side in an axial direction than the first gear, the first side being one side of the rotary electric machine in the axial direction;
the third gear and the fourth gear are disposed more toward a second side in the axial direction than the first gear and the second gear, the second side being another side in the axial direction;
the inverter device is disposed more toward the first side in the axial direction than the fourth gear while being disposed at such a position that the inverter device overlaps the fourth gear as seen in an axial direction along the axial direction.

2. The vehicle drive device according to claim 1, wherein the inverter device includes a power module and a smoothing capacitor.

3. The vehicle drive device according to claim 1, further comprising a case for accommodating the rotary electric machine, the input member, the counter gear mechanism, the differential gear mechanism, and the inverter device, wherein:
the case includes a first accommodating portion for accommodating the rotary electric machine, a second accommodating portion for accommodating the differential gear mechanism, and a third accommodating portion for accommodating the inverter device; and
the first accommodating portion, the second accommodating portion, and the third accommodating portion are integrally provided.

4. The vehicle drive device according to claim 2, further comprising a case for accommodating the rotary electric machine, the input member, the counter gear mechanism, the differential gear mechanism, and the inverter device, wherein:
the case includes a first accommodating portion for accommodating the rotary electric machine, a second accommodating portion for accommodating the differential gear mechanism, and a third accommodating portion for accommodating the inverter device; and
the first accommodating portion, the second accommodating portion, and the third accommodating portion are integrally provided.

* * * * *